(12) United States Patent
Hatano

(10) Patent No.: US 7,656,455 B2
(45) Date of Patent: Feb. 2, 2010

(54) IMAGE PICKUP DEVICE HAVING IMPROVED PRECISION

(75) Inventor: Toshinobu Hatano, Kyoto (JP)

(73) Assignee: Panasonic Corporation, Osaka (JP)

(*) Notice: Subject to any disclaimer, the term of this patent is extended or adjusted under 35 U.S.C. 154(b) by 962 days.

(21) Appl. No.: 11/143,481

(22) Filed: Jun. 3, 2005

(65) Prior Publication Data

US 2005/0270401 A1 Dec. 8, 2005

(30) Foreign Application Priority Data

Jun. 8, 2004 (JP) .............................. 2004-169681

(51) Int. Cl.
H04N 5/225 (2006.01)

(52) U.S. Cl. ...................... 348/361; 348/342

(58) Field of Classification Search ............. 348/224.1, 348/273, 342, 344, 354, 360, 361
See application file for complete search history.

(56) References Cited

U.S. PATENT DOCUMENTS 6,570,619 B1 * 5/2003 Takayama .................. 348/342
6,661,451 B1 * 12/2003 Kijima et al. ............ 348/220.1
2002/0057346 A1 * 5/2002 Hirasawa et al. ............ 348/208

FOREIGN PATENT DOCUMENTS

| JP | 04-142892 | 5/1992 |
|----|-----------|--------|
| JP | 6-245129 | 9/1994 |
| JP | 11-075097 | 3/1999 |
| JP | 2000-333049 | 11/2000 |
| JP | 2000-347018 | 12/2000 |
| JP | 2001-078081 | 3/2001 |
| JP | 2002-135793 A | 5/2002 |
| JP | 2002-281375 | 9/2002 |
| JP | 2003-116061 A | 4/2003 |

OTHER PUBLICATIONS

Japanese Office Action issued in Japanese Patent Application No. 2004-169681, dated Oct. 20, 2009.

* cited by examiner

*Primary Examiner*—Nhan T Tran
*Assistant Examiner*—Akshay Trehan
(74) *Attorney, Agent, or Firm*—McDermott Will & Emery LLP

(57) ABSTRACT

An image pickup device is provided with an optical low pass filter capable of advancing into and retreating from between an optical system and a photoelectric conversion element array in accordance with a selected mode, wherein the optical low pass filter is advanced into between the optical system and the photoelectric conversion element array so as to block a high frequency component of an optical image.

8 Claims, 13 Drawing Sheets

FIG. 4 (at the time of still image photographing entire pixel reading mode)

IMAGE PICKUP DEVICE HAVING IMPROVED PRECISION

BACKGROUND OF THE INVENTION

1. Field of the Invention

The present invention relates to an image pickup device capable of switching to and from a still image photographing and a moving image recording, more particularly to an image pickup device having an entire pixel reading mode in which pixel data read from a photoelectric conversion element array corresponding to entire pixels is sequentially outputted by one pixel each at the time of the still image photographing and a vertical/horizontal pixel mixing reading mode in which pixel data corresponding to a plurality of pixels is mixed in vertical and horizontal directions of the array and outputted at the time of the moving image recording.

2. Description of the Related Art

The number of pixels in a photoelectric conversion element array in an image pickup device has been significantly increasing, which leads to a higher pixel density. In photographing a still image, data of all of pixels in the photoelectric conversion element array are used, which is referred to as an entire pixel reading mode. In the entire pixel reading mode, a high-resolution still image can be photographed because pixel data read from the photoelectric conversion element array corresponding to the entire pixels are sequentially read by one pixel each.

An image pickup device capable of switching to and from a still image photographing and a moving image recording has been proposed (for example, see No. 2002-135793 and No. 2003-116061 of the Publication of the Unexamined Japanese Patent Applications). Currently, it is difficult to record the moving image in the entire pixel reading mode in the same manner as in the still image photographing. The moving image is recorded by thinning the pixels/vertically and horizontally mixing the pixels.

In recording the moving image, the pixel data corresponding to a plurality of pixels read from the photoelectric conversion element array are vertically and horizontally mixed, and the mixed pixel data is outputted in the form of pixel data of one unit. Thereby, the number of frames per unit time increases, which enables the moving image to be smoothly photographed at a high speed even in the image pickup device in which the photoelectric conversion element array of the high pixel density.

The selection between the pixel thinning/pixel mixing reading operation and the entire pixel reading operation is advantageously handled by, in particular, an MOS (Metal Oxide Semiconductor) image sensor because the MOS image sensor does not require charge transfer in response to the movement of a potential well as in a CCD (Charge Coupled Device) image sensor and can read the pixel data in an optional line without any restriction using a signal line. The MOS image sensor is advantageous in reading an optional number of pixels and mixing the pixels in addition to a low voltage operation, a small amount of lead current, a large opening rate, a high sensitivity, a simplified data reading operation and the like.

In an image pickup device provided with a photographing monitor such as a liquid crystal display device is performed an optical-system auto focus. In general, an image of a photographic subject is displayed on the photographing monitor in a moving image mode in an initial state immediately after a power supply is turned on, which is a generally-called monitor mode. In the monitor mode, which is employed in handling the moving image, a vertical/horizontal pixel mixing reading mode in which the pixels are thinned is adopted. Pressing a shutter button in the monitor mode in order to photograph the still image, the auto focus of the optical system is activated when the shutter button remains pressed halfway, the shutter is fully pressed (fully-pressed state) in a focusing-attained state. Then, the current mode is switched to the entire pixel reading mode so as to photograph the still image.

An example of a conventional technology relating to the auto focus is described referring to FIG. 12. In Step S31, an operating state is a photographing standby state immediately after a power supply is turned on, and an operating mode is set to the monitor mode. In Step S32, the mode is set to the vertical/horizontal pixel mixing reading mode. In Step S33, it is judged if the moving image is recorded or the still image is photographed. The operation proceeds to Step S34 when the moving image recording mode is selected by a photographer, and to Step S36 when the still image photographing mode is selected by the photographer.

In the Step S34 in which the moving image recording mode is selected, a lens of the optical system is driven in response to the activation of the auto focus. In Step S35, the moving image is recorded in the vertical/horizontal pixel mixing reading mode when a recording button is manipulated. In the Step S34, the auto focus based on the pixel data mixed in the vertically and horizontally two-dimensional directions is performed.

In Step S36 in which the still image photographing mode is selected, the lens of the optical system is driven in response to a rough auto focus. In Step S37, the halfway-pressed state of the shutter button is judged. In Step S38, the auto focus based on the pixel data mixed in the vertically and horizontally two-dimensional directions is activated, and the lens of the optical system is thereby driven in the same manner as in the Step S34. When it is judged the focusing is attained in Step S39, the operation proceeds to Step S40, in which the mode is set to the entire pixel reading mode, and the shutter button is allowed to be fully pressed. Thereby, the still image is photographed in the entire pixel reading mode.

In the foregoing operation, the auto focus in the Step S34 is performed in the state in which a high frequency component exceeding a pixel mixing pitch of the image sensor is included in an optical image having transmitted through the lens.

In the conventional auto focus, a high-pass component in a frequency characteristic of a signal gain of the pixel data is extracted through a band pass filter, and it is generally determined that the focusing is attained at a peak value of the high-pass component. FIG. 13A shows a frequency characteristic of imaging data when three pixels by every other pixel are mixed in the horizontal direction or vertical direction. In FIG. 13A, a characteristic line L1 denotes the pixel mixing, a characteristic line L2 denotes no pixel mixing, and a characteristic line L3 denotes an optical frequency characteristic (f characteristic) of a lens. FIG. 13B shows a characteristic of a highpass horizontal band pass filter (BPF) used in the auto focus at the time of the moving image mode and still image mode.

When the pixels are mixed and thinned, the Nyquist frequency shifts to a lowpass side, and horizontal highpass information is folded back toward the lowpass side. As a result, in the conventional technology in which the vertical/horizontal pixel mixing reading mode is adopted when the auto focus is controlled in photographing the moving image, the auto focus is controlled in the state in which the optical image having transmitted through the lens includes the high frequency component exceeding the pixel mixing pitch of the image sensor, that is the state in which the high frequency component of the optical image has been folded back in a spatial sampling on the image sensor. Therefore, a false signal due to the folded-back component is generated in the focused state, which deteriorates an image quality.

SUMMARY OF THE INVENTION

An image pickup device according to the present invention comprises:

an optical system;

a photoelectric conversion element array for photo-electrically converting an optical image entering through the optical system and outputting the converted optical image in the form of pixel data;

a pixel data reading control unit for reading the pixel data from the photoelectric conversion element array in a still image-compliant entire pixel reading mode and a moving image-compliant pixel mixing reading mode;

an optical low pass filter provided between the optical system and the photoelectric conversion element array so as to advance and retreat therebetween; and a control unit for controlling the advancement/retreat of the optical low pass filter, wherein the control unit makes the optical low pass filter advance into between the optical system and the photoelectric conversion element array in the moving image-compliant pixel mixing reading mode to thereby block a high frequency component of the optical image.

According to the present invention, the optical low pass filter is advanced into between the optical system and the photoelectric conversion element array when the moving image is recorded so that the high frequency component of the optical image having transmitted through the lens of the optical system and the optical low pass filter is band-restricted in order not to exceed a pixel mixing pitch of the photoelectric conversion element array as an image sensor. Thereby, the image is taken on the photoelectric conversion element array without the generation of the folded-back high frequency component of the optical image. At that time, the pixel mixing reading mode is set in the pixel data reading control unit, and the pixel data read from the photoelectric conversion element array corresponding to a plurality of pixels are mixed. More specifically, when the pixels are thinned and the number of frames per unit time is increased in processing the pixel data, the moving image achieving a smooth motion in a high pixel density can be recorded, and further, the moving image of a high quality can be outputted because a false signal is not all generated in a focused state in which an auto focus is controlled.

The control unit preferably makes the optical low pass filter retreat from between the optical system and the photoelectric conversion element array in the still image-compliant entire pixel reading mode.

According to the foregoing constitution, the optical low pass filter is removed from between the optical system and the photoelectric conversion element array and disposed and the high frequency component of the optical image is not band-restricted when the still image is photographed. The entire pixel reading mode is set in the pixel data reading control unit, and the pixel data read from the photoelectric conversion element array corresponding to all of the pixels are sequentially read by one pixel each. Thereby, the reduced image can be photographed achieving a high resolution and a high pixel density.

The still image-compliant entire pixel reading mode includes a mode responding to a small-size image recording. The control unit preferably makes the optical low pass filter advance into between the optical system and the photoelectric conversion element array in the mode responding to the small-size image recording so as to block the high frequency component of the optical image.

According to the foregoing constitution, when a so-called digital zoom is used to record the reduced still image, the optical low pass filter is advanced into between the optical system and the photoelectric conversion element array so as to block the high frequency component of the optical image. Therefore, the recorded reduced image can attain a high quality because no distortion is generated in the absence of the folded-back high frequency component.

The optical low pass filter may include a plurality of optical low pass filters for respectively band-restricting the high frequency component in different manners in accordance with the small-size still image photographing, and the control unit may control the advancement/retreat of the plurality of optical low pas filters in accordance with a size of the reduced image.

In a preferred embodiment of the present invention, a control unit for controlling a focal point of the optical system based on the pixel data outputted for the auto focus from the pixel data reading control unit is provided, the moving image-compliant pixel mixing reading mode is a vertical/horizontal pixel mixing reading mode for mixing the pixel data corresponding to a plurality of pixels in the vertical and horizontal directions of the array, and the pixel data reading control unit further comprises a one-direction-only pixel mixing reading mode for outputting one-direction-only mixed pixel data for the auto focus in the state in which the mixing operation is halted in one of the vertical and horizontal directions of the photoelectric conversion element array when the pixel data read from the array corresponding to the plurality of pixels at the time of the auto focus control.

According to the foregoing embodiment, when the auto focus is controlled in photographing the still image, the one-direction-only pixel mixing reading mode is additionally set as a new mode in the pixel data reading control unit. In the one-direction-only pixel mixing reading mode, the mixing of the pixel data corresponding to the plurality of pixels read from the photoelectric conversion element array is halted in one of the vertical and horizontal directions of the array, while the mixing operation is carried out in the other direction so that basic data for the auto focus is outputted. The basic data for the auto focus includes the pixel data corresponding to all of the pixels in one of the vertical and horizontal directions, and the highpass information is retained in the one direction. Therefore, there is no omission of information as in the conventional technology. The auto focus can attain a largely improved precision in comparison to the conventional technology because the auto focus is controlled using the basic data for the auto focus undergoing no omission of information.

In the foregoing constitution, the pixel data reading control unit is not subjected to any particular restriction in that the pixel mixing is halted in the horizontal direction or the vertical direction in the one-direction-only pixel mixing reading mode.

1) The mixing is halted in the horizontal direction of the photoelectric conversion element array, while the mixed pixel data only in the vertical direction is outputted for the auto focus.

2) The mixing is halted in the vertical direction of the photoelectric conversion element array, while the mixed pixel data only in the horizontal direction is outputted for the auto focus.

3) A first mixing halt mode in which the mixing is halted in the horizontal direction and the mixed pixel data only in the vertical direction is outputted for the auto focus recited in 1) and a second mixing halt mode in which the mixing is halted in the vertical direction and the mixed pixel data only in the horizontal direction is outputted for the auto focus recited in 2) are provided, wherein the first and second mixing halt modes can be optionally selected.

The photoelectric conversion element array may be of a monochrome type or a color type. In the case of the color type, a color filter comprising a plurality of colors is provided in a previous stage of the array. There is no restriction to a type of the color filter, allowing it to be a color filter of Bayer array using RGB (R is red, G is green and B is blue) or a color filter using complementary colors such as cyanogen, magenta and yellow (further, green).

BRIEF DESCRIPTION OF THE DRAWINGS

The present invention is illustrated be way of example and not limitation in the figures of the accompanying drawings, in which like reference indicate similar elements and in which.

DETAILED DESCRIPTION OF PREFERRED EMBODIMENTS OF THE INVENTION

Figure 1:
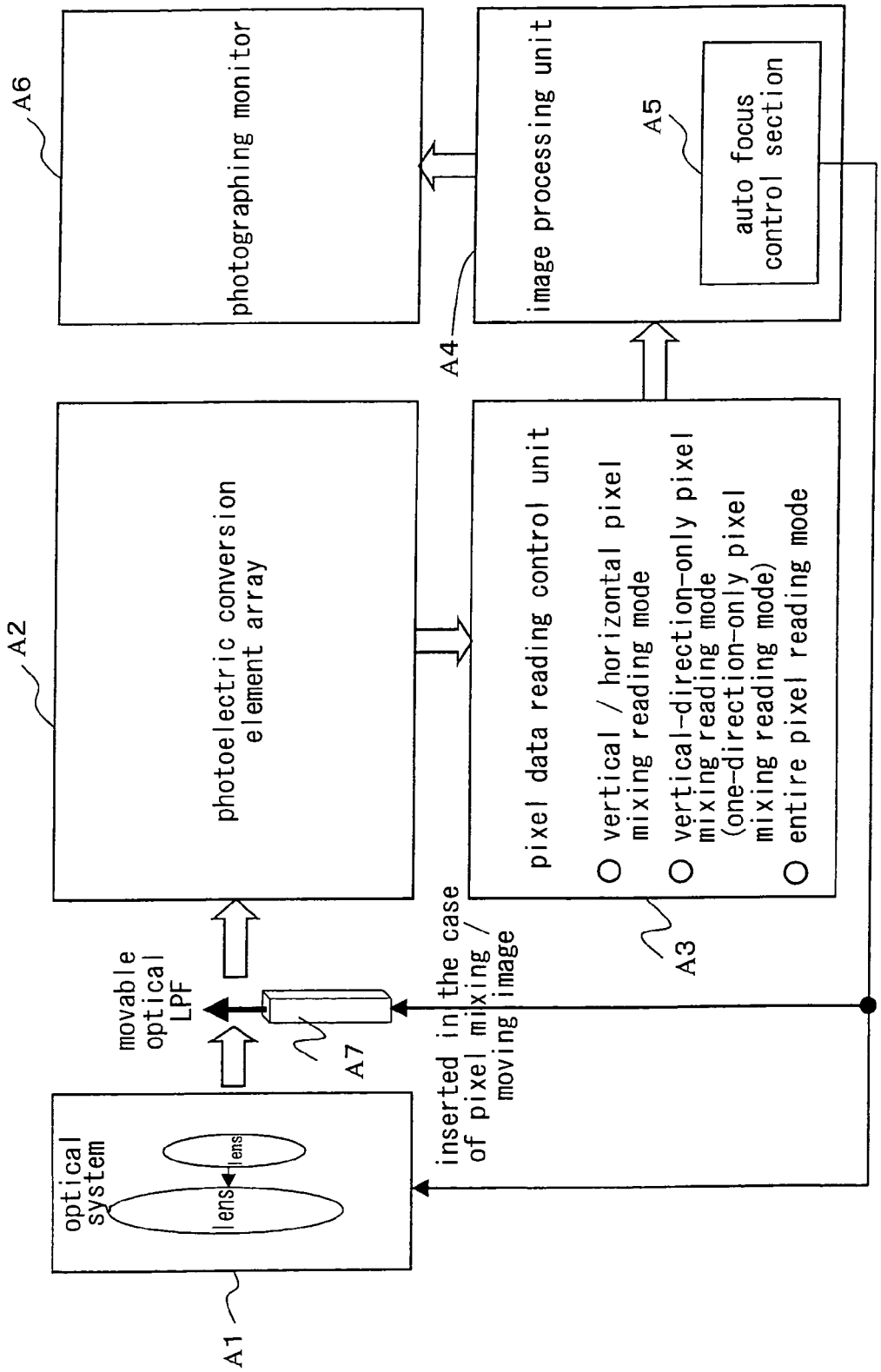
FIG. 1 is a block diagram illustrating a basic constitution of an image pickup device according to an embodiment of the present invention.

Hereinafter, an image pickup device according to preferred embodiments of the present invention is described in detail referring to the drawings. Referring to reference symbols shown in FIG. 1, A1 denotes an optical system comprising a plurality of combined lenses for receiving an incoming optical image of a photographic subject, A2 denotes a photoelectric conversion element array provided with a color filter in which photoelectric conversion elements for photo-electrically converting the optical image from the optical system A1 are arrayed in a matrix shape, A3 denotes a pixel data reading control unit for reading pixel data from the photoelectric conversion element array A2 and outputting the pixel data optionally changing a mode, A4 denotes an image processing unit for inputting and image-processing the pixel data from the pixel data reading control unit A3, A5 denotes an auto focus control section incorporated into the image processing unit A4, and A6 denotes a photographing monitor.

A7 denotes an optical low pass filter provided between the optical system A1 and the photoelectric conversion element array A2 so as to advance and retreat therebetween, the optical low pass filter eliminating a high frequency component included in the optical image from the optical system A1 when advancing into between the two components.

The pixel data reading control unit A3 comprises the following mode (3) in addition to the following two modes recited in (1) and (2).

1) entire pixel reading mode for still image photographing:
   mode for sequentially outputting the read pixel data corresponding to all of the pixels by one pixel each.
2) vertical/horizontal pixel mixing reading mode for moving image recording:
   mode for mixing the read pixel data corresponding to a plurality of pixels in vertical and horizontal directions of the array and outputting the mixed pixel data.
3) vertical-direction-only pixel mixing reading mode:
   in the case of mixing the read pixel data corresponding to the plurality of pixels at the time of auto focus control in a monitor mode, the mixing in the horizontal direction of the array is halted, while the mixed pixel data in only the vertical direction is outputted for the auto focus.

Figure 2:
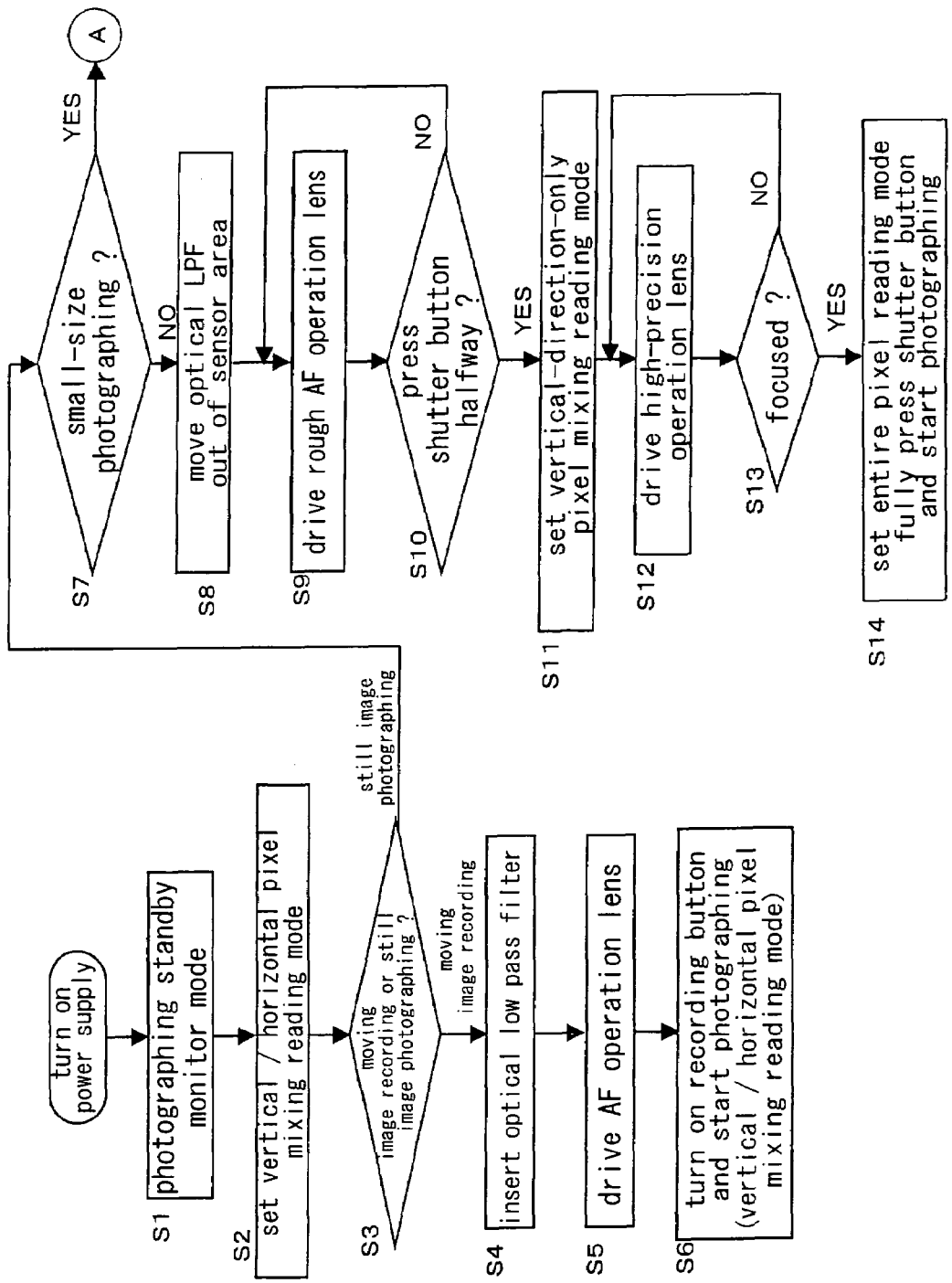
FIG. 2 is a flow chart of an operation of the image pickup device according to the embodiment.
Figure 3:
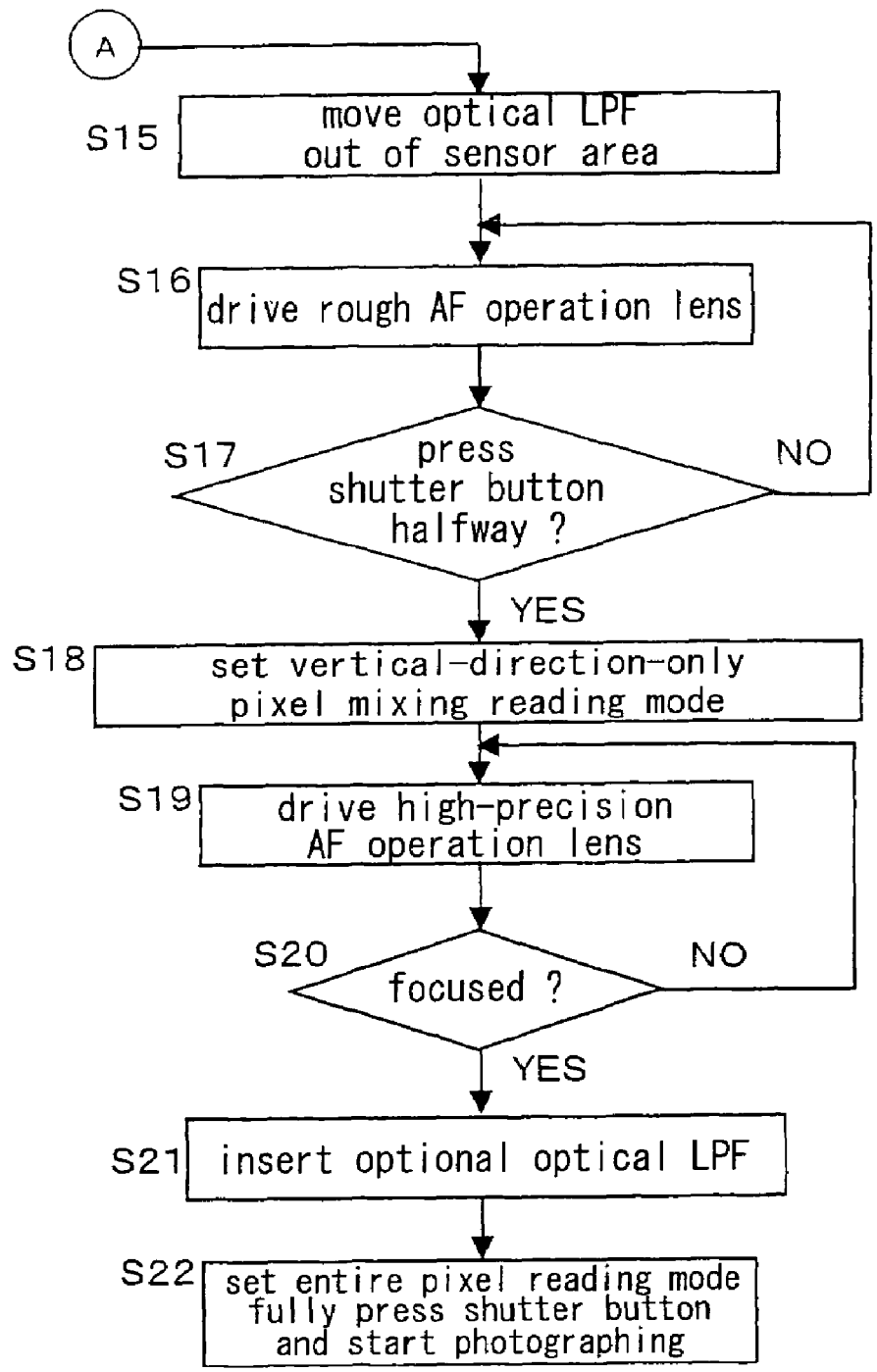
FIG. 3 is a flow chart of the operation of the image pickup device according to the embodiment.

An operation of the foregoing image pickup device is described referring to flow charts of FIGS. 2 and 3.

Step S1

An operating state is a photographing standby state immediately after a power supply is tuned on, and an operating mode is set to the monitor mode.

Step S2

A reading mode to be set is the vertical/horizontal pixel mixing reading mode. In the mode, the optical image of the photographic subject entering through the optical system A1 is focused on the photographic conversion element array A2 and photo-electrically converted into pixel data by the photoelectric conversion element array A2. The pixel data reading control unit A3 reads the pixel data from the photoelectric conversion element array A2. When the power supply is turned on, the operating mode is set to the monitor mode, and the reading mode of the pixel data reading control unit A3 is set to the vertical/horizontal pixel mixing reading mode. The pixel data generated in the vertical/horizontal pixel mixing operation is outputted to the image processing unit A4 from the pixel data reading control unit A3. The image processing unit A4 executes a CDS (Correlated Double Sampling) process to the inputted pixel data to thereby eliminate a reset noise and a low frequency noise and executes an AGC (Automatic Gain Control) process. The processed analog data is converted into digital data, and the converted digital data is outputted to the photographing monitor A6. The photographing monitor A6 monitor-displays an image of the photographic subject in real time.

Step S3

It is judged if a photographing mode is a moving image recording or a still image photographing. The operation proceeds to Step S4 when the moving image recording mode is selected by a photographer, and proceeds to Step S7 when the still image photographing mode is selected by the photographer.

Step S4

In the Step S4 in which the moving image recording mode is selected, the optical low pass filter A7 advances into between the optical system A1 and the photoelectric conversion element array A2. The advancement of the optical low pass filter A7 eliminates the high frequency component included in the optical image. The optical image is band-restricted so as to respond to a pixel mixing pitch as a result of the elimination of the high frequency component.

Step S5

The auto focus (AF) is activated. In the activation, the lenses of the optical system A1 are driven. The auto focus is implemented based on the mixed pixel data in the vertically and horizontally two-dimensional directions.

Step S6

When a recording button is manipulated, the moving image is recorded in the vertical/horizontal pixel mixing reading mode.

As described, when the moving image is recorded, the optical low pass filter A7 advances into between the optical system A1 and the photoelectric conversion element array A2. Thereby, the high frequency component of the optical image having transmitted through the lenses of the optical system A1 and the optical low pass filter A7 is band-restricted in order to stay below the pixel mixing pitch of the photoelectric conversion element array A2. As a result, the image is picked up in the absence of the folded-back high frequency component in the optical image in a spatial sampling on the photoelectric conversion element array A2. Therefore, the generation of a false signal resulting from the auto focus can be prevented in a focused state, and the moving image obtained through the auto focus control can be recorded in a high quality.

Step S7

In the Step S3, when the still image photographing mode is selected, the operation proceeds to Step S7. In the Step S7, it is judged if a small-size (reduced size) photographing or a full-size photographing is carried out.

Step S8

When it is judged that the full-size photographing mode is carried out in the Step S7, the operation proceeds to Step S8. In the Step S8, the optical low pass filter A7 retreats from between the optical system A1 and the photoelectric conversion element array A2.

Step S9

In the still image photographing mode, the high frequency component of the optical image is not band-restricted because the optical low pass filter A7 retreats from between the optical system A1 and the photoelectric conversion element array A2. The reading mode of the pixel data reading control unit A3 is set to the entire pixel reading mode as in Step S14 described later. In the entire pixel reading mode, the pixel data read from the photoelectric conversion element array A2 corresponding to all of the pixels are sequentially outputted by one pixel each. Thereby, the still image attaining a high pixel density and a high resolution can be photographed.

In Step S9, the lenses of the optical system A1 are driven by a rough auto focus.

Step S10

It is judged whether or not the shutter button is pressed halfway.

Step S11

When the shutter button is pressed halfway, the mode to be set is the vertical-direction-only pixel mixing reading mode recited in (3). As a result, the pixel data reading control unit A3 outputs the pixel data of a plurality of lines which are mixed in the vertical direction but constitute the uninterrupted entire pixels without the thinning process in the horizontal direction (referred to as vertical-direction-only mixed pixel data) to the image processing unit A4 as basic data for the auto focus.

Step S12

A high-precision auto focus is activated based on the vertical-direction-only mixed pixel data. The lenses of the optical system A1 are driven by the high-precision auto focus.

Step S13

It is judged if the focusing is attained in the auto focus.

Step S14

When it is judged that the focusing is attained in the auto focus, the mode is set to the entire pixel reading mode, and the shutter button is allowed to be fully pressed so that the still image is photographed in the entire pixel reading mode.

As a result of the foregoing steps, the basic data for the auto focus is the pixel data of the plurality of lines which are mixed in the vertical direction but constitute the uninterrupted entire pixels without the thinning process in the horizontal direction vertical-direction-only mixed pixel data. Therefore, the auto focus control in which any information is not omitted in the horizontal direction is carried out. As a result, the precision of the auto focus is largely improved, and the still image achieving a high resolution can be photographed.

Step S15

When the still image photographing mode is selected in the Step S3, and the small-size (reduced image) photographing mode is selected in the Step S7, the operation proceeds to Step S15 shown in FIG. 3. In the Step S15, the optical low pass filter A7 retreats from between the optical system A1 and the photoelectric conversion element array A2. Thereby, the optical low pass filter A7 moves out of an area of the photoelectric conversion element array A2.

Step S16

The lenses of the optical lenses are driven by the rough auto focus.

Step S17

It is judged if the shutter button is pressed halfway.

Step S18

When the shutter button is pressed halfway, the mode is set to the vertical-direction-only pixel mixing reading mode.

Step S19

The lenses of the optical system A1 are driven by the high-precision auto focus using the vertical-direction-only mixed pixel data.

Step S20

It is judged if the focusing is attained in the auto focus.

Step S21

When the focusing is attained in the auto focus, an optical low pass filter having a frequency characteristic in compliance with a pixel pitch of the small-size data to be recorded (optional low pass filter) is inserted.

Step S22

The mode is set to the entire pixel reading mode, and the shutter button is allowed to be fully pressed. Thereby, the still image is photographed in the entire pixel reading mode.

Figure 4:
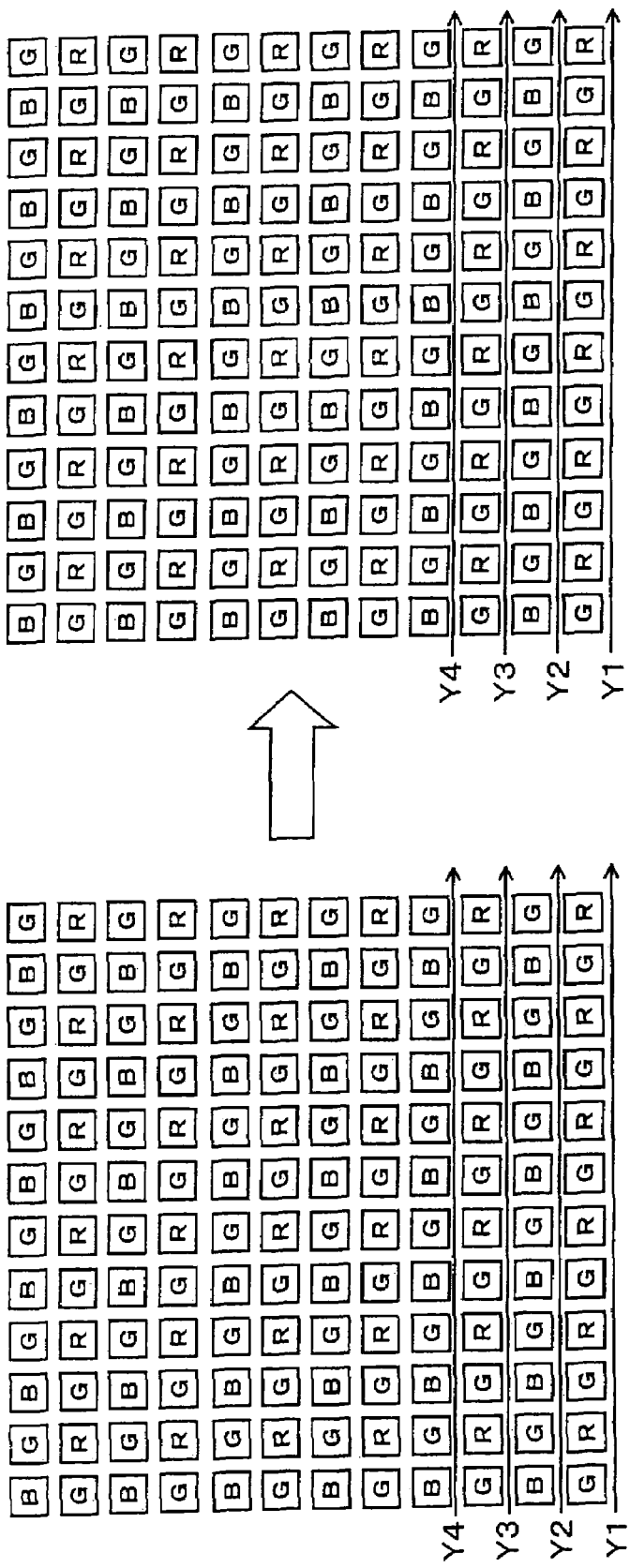
FIG. 4 is a model diagram illustrating an operation of an entire pixel reading mode of the image pickup device according to the embodiment.
Figure 5:
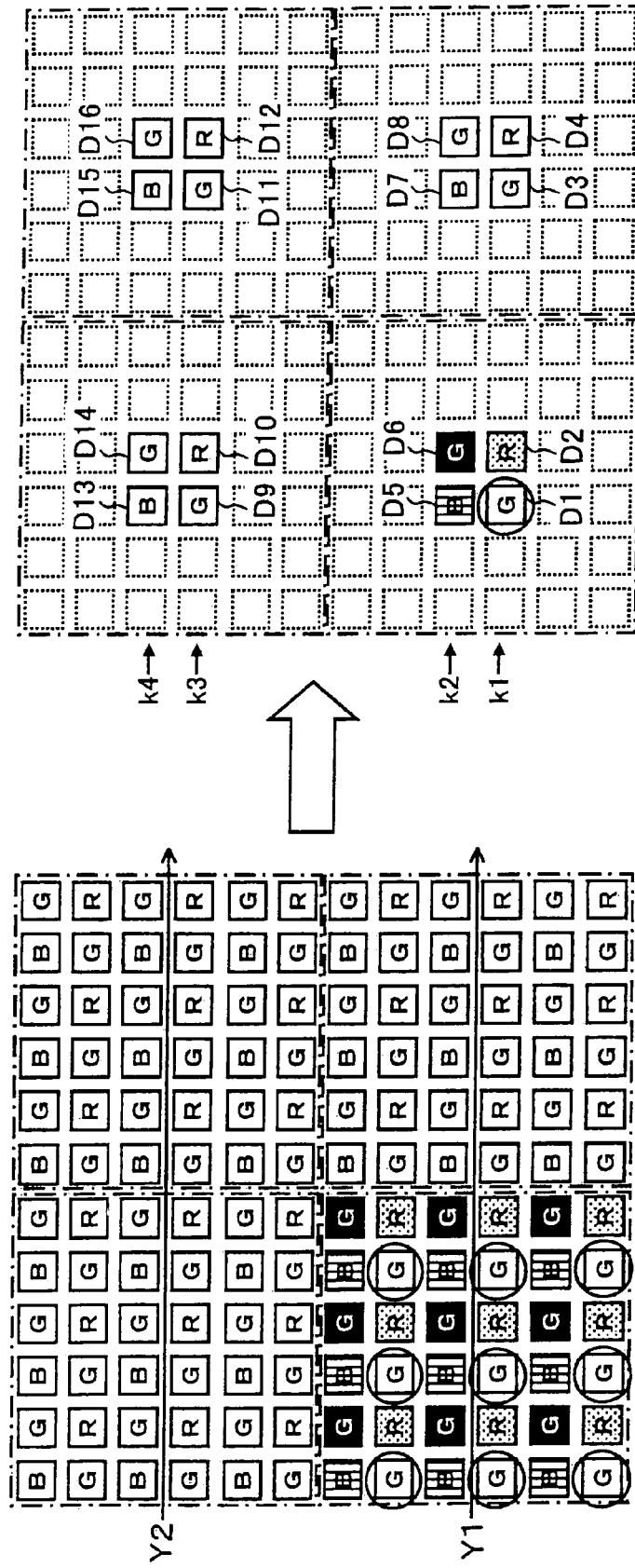
FIG. 5 is a model diagram illustrating an operation of a vertical/horizontal pixel mixing reading mode of the image pickup device according to the embodiment.
Figure 6:
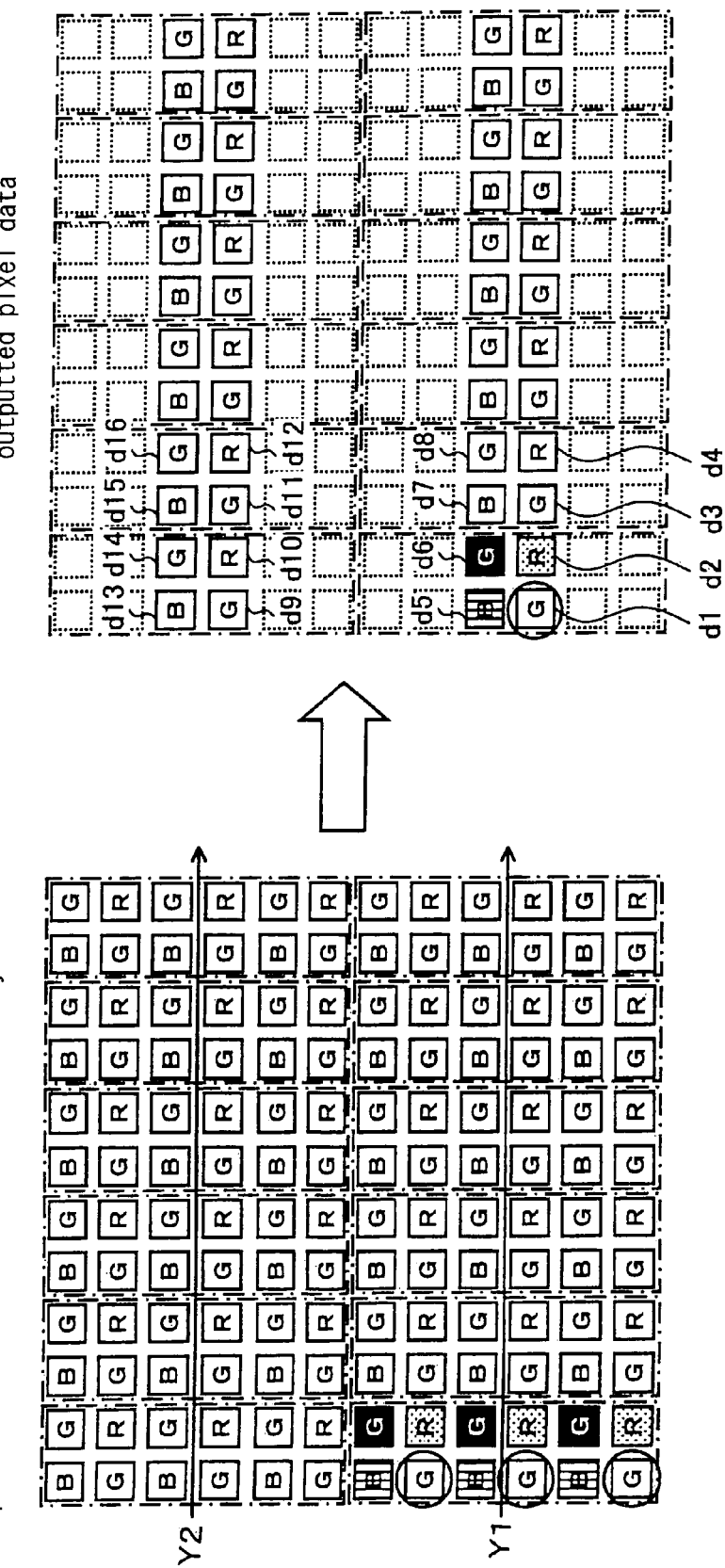
FIG. 6 is a model diagram illustrating an operation of a vertical-direction-only pixel mixing reading mode of the image pickup device according to the embodiment.

The entire pixel reading mode, vertical/horizontal pixel mixing reading mode and vertical-direction-only pixel mixing reading mode are described further in detail referring to FIGS. 4, 5 and 6.

FIGS. 4, 5 and 6 are model diagrams illustrating an example of the respective reading modes in a simplified manner. In the respective drawings, a part of the photoelectric conversion element array A2 is shown on the left side, while the pixel data outputted by the pixel data reading control unit A3 on the right side. In the photoelectric conversion element array, G (green), R (red) and B (blue) are Bayer-arrayed.

In the model of the entire pixel reading mode shown in FIG. 4, the pixel data of all of the pixels in the photoelectric conversion element array are outputted. The present mode is employed in photographing the still image. A scanning operation is implemented in the order of Y1, Y2, Y3, Y4, It is understood that the still image achieving a high pixel density and a high resolution can be photographed in the entire pixel reading mode because the pixel data of the entire pixels are used.

The model of the vertical/horizontal pixel mixing reading mode shown in FIG. 5 is employed in recording the moving image. The pixels of the photoelectric conversion element array in six rows and six columns (36 pixels in total) shown on the left side in FIG. 5 are regarded as one unit. As shown on the right side of FIG. 5, the pixel data of two Gs (green), the pixel data of one R (red) and the pixel data of one B (blue) are outputted from the one unit. In the outputted pixel data shown on the right side in FIG. 5, mixed pixel data of a first circled G (green) results from mixing pixel data of circled nine Gs (green) in the photoelectric conversion element array shown on the left side in FIG. 5. In the same manner, mixed pixel data of R (red) next to the circled G to right, which is shown on the right side in FIG. 5, results from mixing pixel data of nine Rs (red) respectively next to the circled Gs to right in the photoelectric conversion element array shown on the left side in FIG. 5. In the same manner, mixed pixel data of B (blue) above the circled G, which is shown on the upper side in FIG. 5, results from mixing pixel data of nine Bs (blue) respectively above the circled Gs in the photoelectric conversion element array shown on the left side in FIG. 5. In the same manner, mixed pixel data of a second G (green) on the upper right of the circled G, which is shown on the right side in FIG. 5, results from mixing pixel data of nine Gs (green) respectively on the upper right of the circled Gs in the photoelectric conversion element array shown on the left side in FIG. 5. The foregoing pattern is repeated by each array consisting of the six rows and six columns serving as one unit. The scanning operation is implemented in the order of Y1, Y2, . . . .

The pixel data of the photoelectric conversion element array A2 shown on the left side in FIG. 5 is thinned by ⅓ in the horizontal direction, by ⅓ in the vertical direction and by ⅑ on the whole, and outputted as the mixed pixel data shown on the right side in FIG. 5.

Further, the mixed pixel data maintains the Bayer array. More specifically, a first row (k1) of the outputted pixel data is the array of G, R, G, R . . . , a second row (k2) thereof is the array of B, G, B, G . . . , a third row (k3) thereof is the array of G, R, G, R . . . , and a fourth row (k4) thereof is the array of B, G, B, G . . . .

The foregoing mixed pixel data enables the moving image of a high resolution to be recorded.

FIG. 6 is the model diagram of the vertical-direction-only pixel mixing reading mode at the time of the auto focus control in the monitor mode. In the pixel data to be outputted, the pixels are thinned in the vertical direction, while the pixel data of the entire uninterrupted pixels are continuously outputted in the horizontal direction with the thinning operation being halted. In the output state in the horizontal direction, two pixel data of G, one pixel data of R and one pixel data of B are outputted based on one unit of 12 arrays in total consisting of six rows and two columns. One-direction-only mixed pixel data of a circled fist G (green) results from mixing pixel data of three circled G pixels in the photoelectric conversion element array. One-direction-only mixed pixel data of R (red) next to the circled G to right results from mixing pixel data of three R pixels respectively next to the circled Gs to right in the optical photoelectric conversion element array. One-direction-only mixed pixel data of B (blue) above the circled G results from mixing pixel data of three B pixels respectively above the circled Gs in the optical photoelectric conversion element array. One-direction-only mixed pixel data of a second G (green) on the upper right of the circled G results from mixing pixel data of three G pixels respectively on the upper right of the circled Gs in the optical photoelectric conversion element array. The foregoing pattern is repeated by each array consisting of the six rows and two columns serving as one unit. The scanning operation is implemented in the order of Y1, Y2, . . . . The Bayer array is maintained here as in the before-mentioned case.

In the vertical-direction-only pixel mixing reading mode, the pixel data is thinned in the vertical direction but not in the horizontal direction, and the pixel data of all of the pixels is continuously outputted. More specifically, the auto-focus basic data with no omission of information in the horizontal direction is created, and the auto focus is controlled based on the data.

As described, the auto focus of a high precision as close as possible to the pixel pitch is realized, based on which the high-pixel and high-resolution still image photographing is shown in FIG. 4 carried out. Therefore, the obtained still image can attain a significantly improved resolution and quality in comparison to the conventional technology in which the vertical/horizontal pixel mixing reading mode is adopted at the time of the auto focus control.

Figure 7:
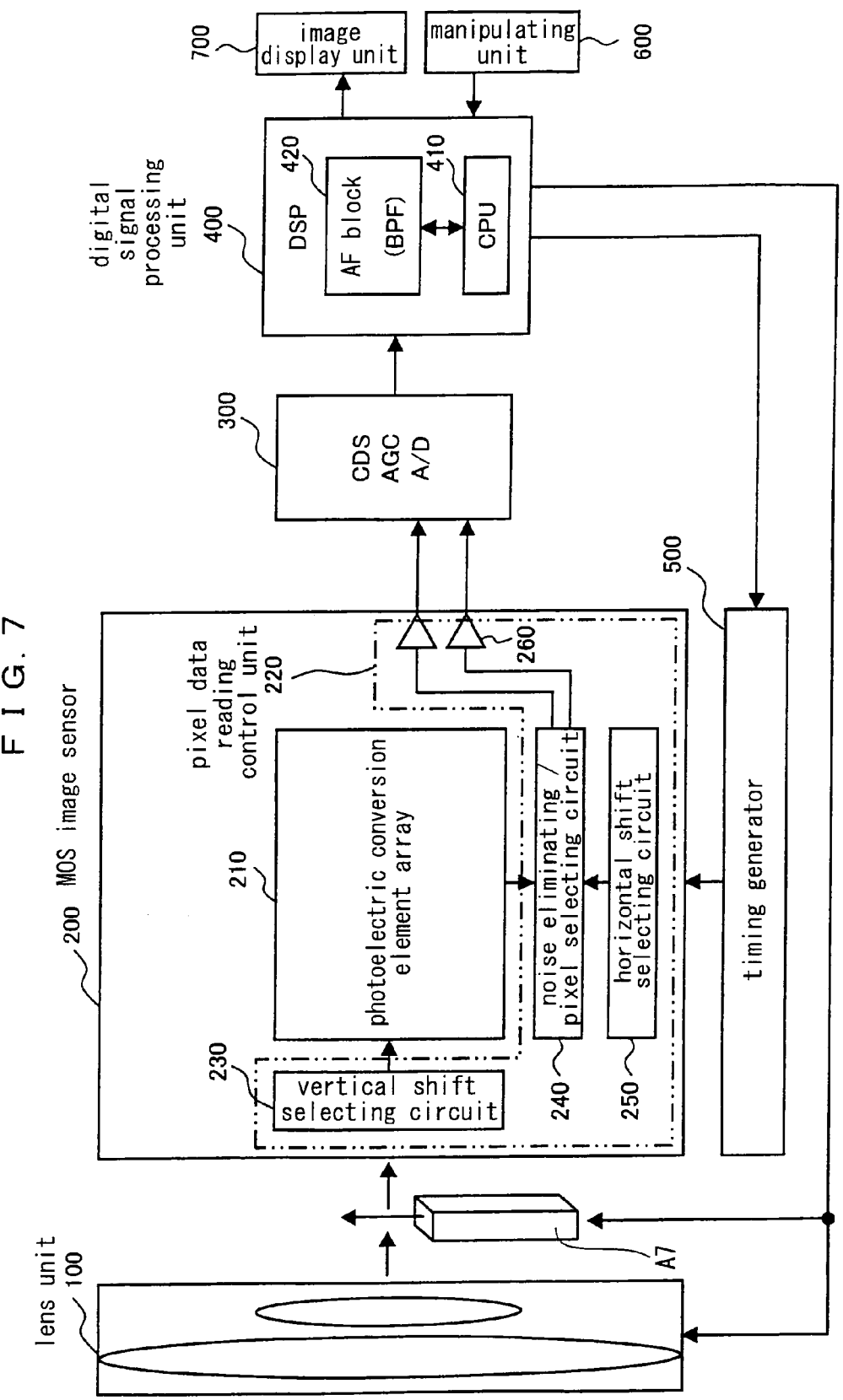
FIG. 7 is a block diagram of the constitution of the image pickup device according to the embodiment illustrated in a more detailed level.

FIG. 7 is a more detailed view of the constitution of FIG. 1. Referring to reference numerals shown in FIG. 7, 100 denotes a lens unit, 200 denotes an MOS image sensor, 300 denotes a CDS/AGC/A/D processing unit, 400 denotes a digital signal processing unit, 500 denotes a timing generator, 600 denotes a manipulating unit, and 700 denotes an image display unit.

The lens unit 100 corresponds to the optical system A1. The MOS image sensor 200 comprises a photoelectric conversion element array 210 and a pixel data reading control unit 220. The photoelectric conversion element array 210 corresponds to the photoelectric conversion element array A2, and the pixel data reading control unit 220 corresponds to the pixel data reading control unit A3. The pixel data reading control unit 220 comprises a vertical shift selecting circuit 230, a noise eliminating/pixel selecting circuit 240, a horizontal shift selecting circuit 250 and an output amplifier 260. The output amplifier 260 may comprise one channel or two channels. The CDS/AGC/A/D processing unit 300 and the digital signal processing unit 400 correspond to the image processing unit A4. The digital signal processing unit 400 comprises a CPU 410 and an AF block 420, and also a digital zoom section not shown.

A focus lens of the lens unit 100 is adapted to be focus-driven by the CPU 410 and the AF block 420 to thereby attain the focusing. The digital zoom section is adapted to temporarily store the pixel data in a memory and apply a thinning process and the like thereto in accordance with a set reducing scaling factor of an image thereby obtain a reduced (small-size) image.

The CPU 410 serves as an advancement/retreat control unit for controlling the advancement/retreat of a movable A7 low pass filter A7.

Figure 8:
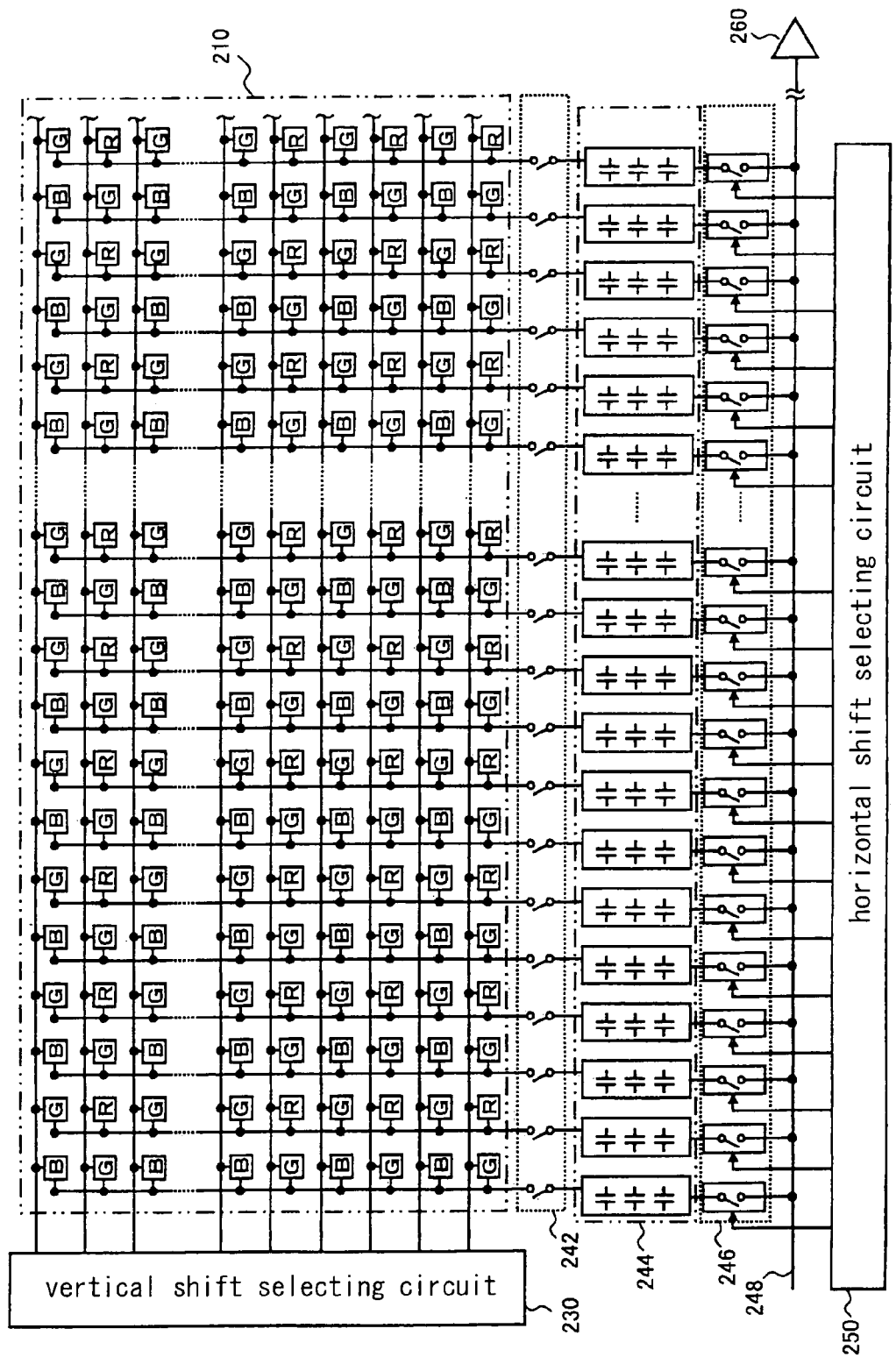
FIG. 8 is a circuit diagram illustrating a detailed constitution of a noise eliminating/pixel selecting circuit of the image pickup device according to the embodiment.

FIG. 8 is a block diagram illustrating a further detailed constitution of the noise eliminating/pixel selecting circuit 240. Referring to reference numerals in FIG. 8, 242 denotes a vertical transfer switch circuit, 244 denotes a signal voltage retaining circuit, 246 denotes a horizontal transfer switch circuit, and 248 denotes a signal output line.

Figure 9:
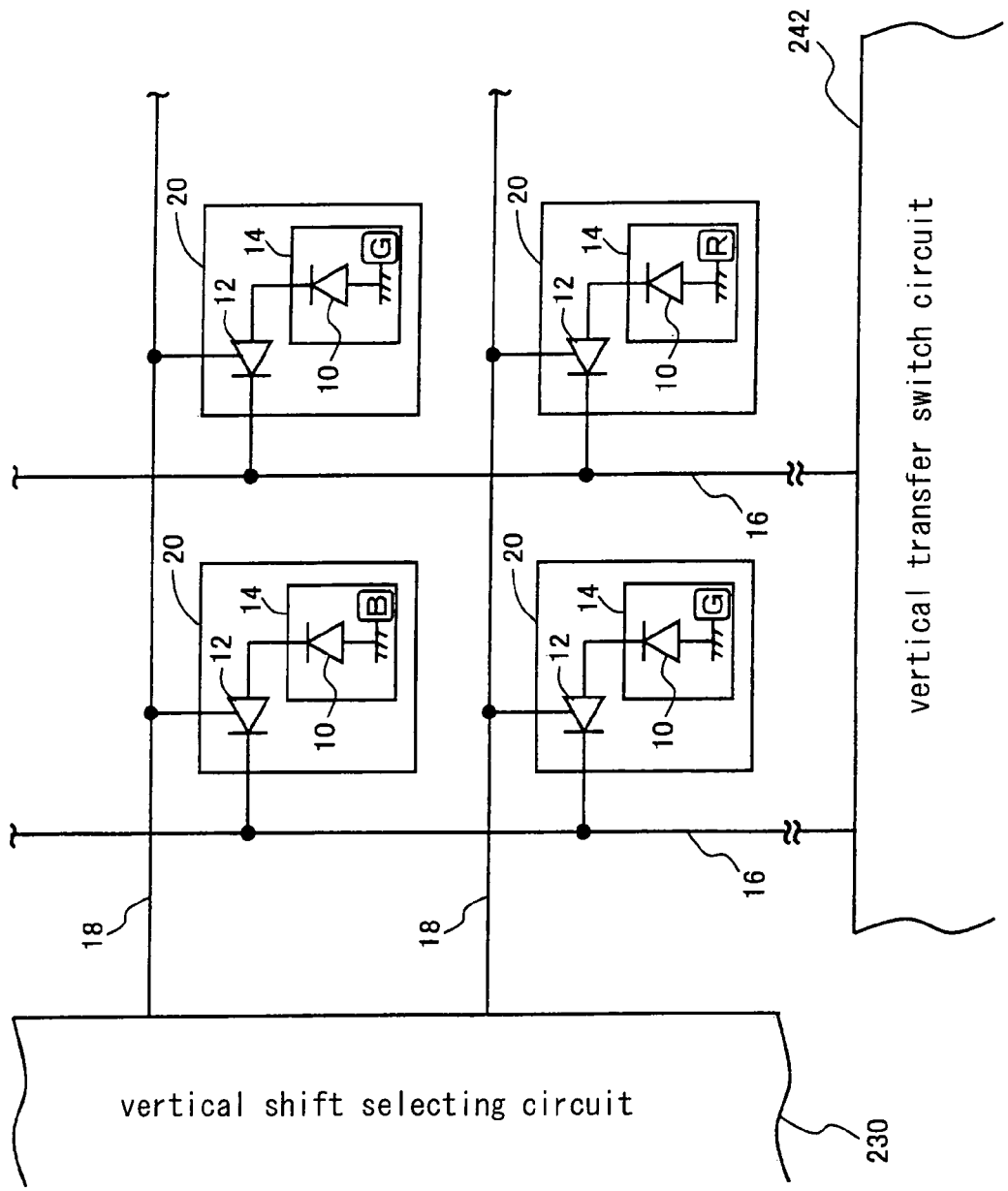
FIG. 9 is a circuit diagram illustrating an enlarged part of a photoelectric conversion element array of the image pickup device according to the embodiment.

FIG. 9 is an enlarged view of a part of the photoelectric conversion element array 210. A pixel 20 is comprised of a photo diode 10, a cell amplifier 12 and a color filter 14. An anode of the photo diode 10 is grounded, a cathode of the photo diode 10 is connected to an input of the cell amplifier 12, and an output of the cell amplifier 12 is connected a vertical pixel data reading line 16. A control terminal of the cell amplifier 12 is connected to a scanning line 18 extending from the vertical shift selecting circuit 230.

The color filter 14 is provided in a previous stage of the photo diode 10. The color filter 14 is adapted to constitute the Bayer array (G, R, B, G) in groups of four pixels each. Regarding four pixels in two rows and two columns as a unit, in which a first G (green) and R (red) are arrayed and B (blue) and a second G (green) are arrayed in the horizontal direction, while the first G (green) and B (blue) are arrayed and R (red) and the second G (green) are arrayed in the vertical direction, a large number of units consisting of four pixels are arrayed in a vertical and horizontal matrix shape.

Entire Pixel Reading Mode

Figure 10:
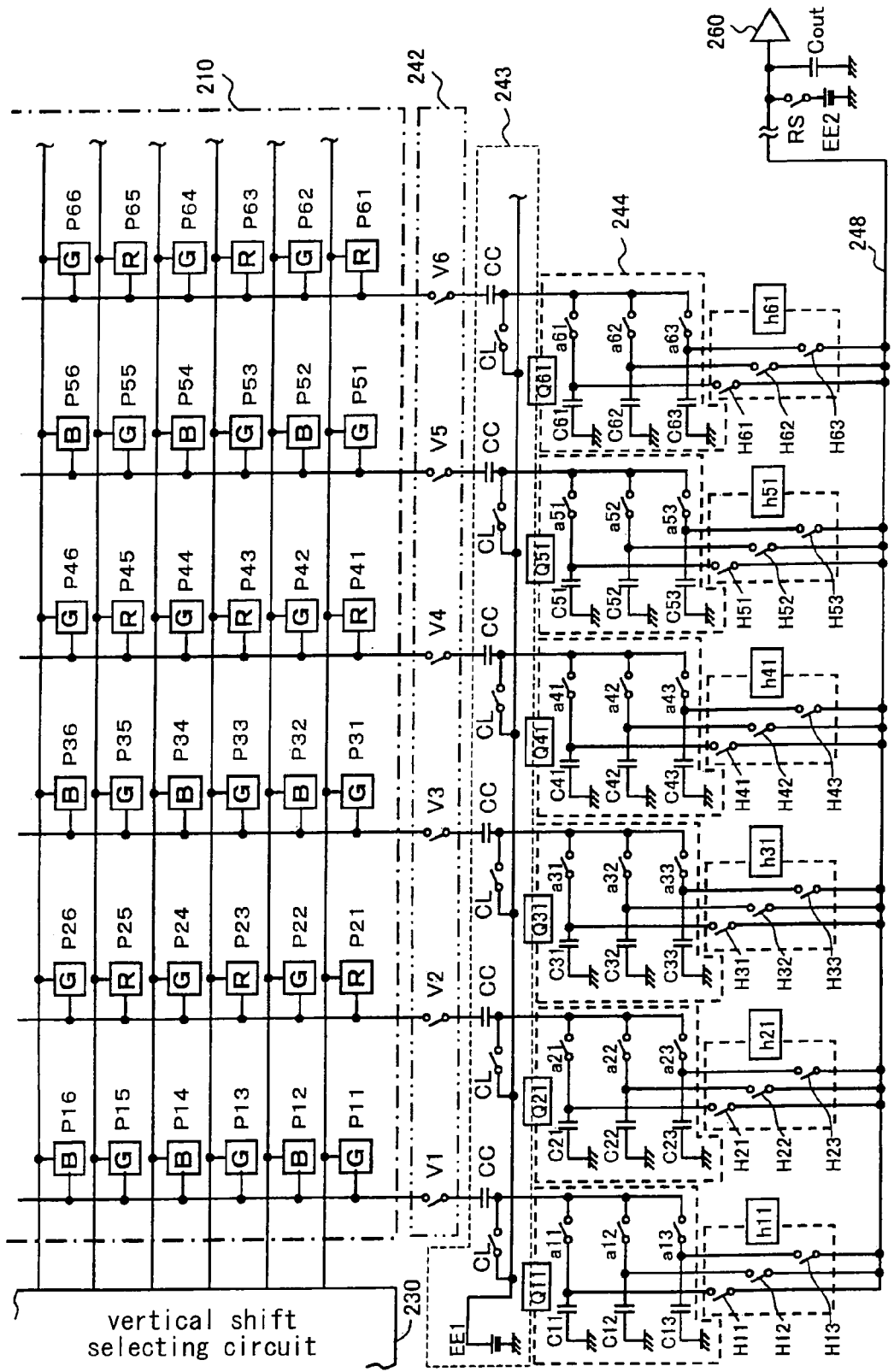
FIG. 10 is a circuit diagram illustrating an enlarged part constituting a circuit for reading pixel data in the image pickup device according to the embodiment.

An operation of the entire pixel reading mode is described referring to FIG. 10. FIG. 10 is an enlarged view of a part constituting a circuit for reading the pixel data. In FIG. 10, the output amplifier 260 has one channel, and the noise eliminating circuit 243 is shown (not shown in FIG. 8). The pixel data corresponding to the pixels in one line is reset and noise-eliminated using clamp switches CL once at a reference potential of the cell amplifier after the line is selected within a horizontal blanking period, and a signal voltage is thereafter read and retained.

In an initial stage of the per-pixel reading operation, a reset switch RS is temporarily closed, and a capacitor Cout for signal output is reset to a VDD level of a power supply EE2 for reset. After the reset, the reset switch RS is opened. Further, the clamp switches CL are temporarily closed, and all of clamp capacitors CC are thereby reset. After the reset, the clamp switches CL are opened.

A first line of the photoelectric conversion element array 210 is selected by the vertical shift selecting circuit 230. The clamp switches CL of the noise eliminating circuit 243 are temporarily closed, and all of the clamp capacitors CC are thereby reset. After the reset, the clamp switches CL are opened. Thereafter, all of vertical transfer switches V1, V2, V3, ... are simultaneously closed, and all of transmittance switches a11, a21, a31, ... are simultaneously closed. Then, voltage signals in pixels P11, P21, P31, ... are respectively supplied to capacitors Q11, Q21, Q31, ... (supplied to all of the three capacitors, however, may be supplied to only one of the capacitors).

Next, horizontal transfer switches h11, h21, h31, ... are sequentially closed (at that time, the per-pixel reset is implemented by the reset switch RS), and the pixel data of the entire pixels in one line is outputted via the signal-output capacitor Cout and the output amplifier 260.

More specifically, first, the first horizontal transfer switch h11 (all of three switches H11, H12 and H13) is closed, pixel data of the pixel P11 of a first column in a first line retained in the capacitor Q11 is outputted via the signal-output capacitor Cout and the output amplifier 260. Next, the second horizontal transfer switch h21 (all of three switches H21, H22 and H23) is closed, and pixel data of the pixel P21 of a second column in the first line retained in the capacitor Q21 is outputted. Next, the third horizontal transfer switch (all of three switches H31, H32 and H33) is closed, pixel data of the pixel P31 of a third column in the first line retained in the capacitor Q31 is outputted. In the same manner as described above, horizontal transfer switches h41, h51, h61, ... are sequentially closed, and pixel data of pixels P41, p51, P61, ... of a fourth column, fifth column sixth column, ... in the first line respectively retained in capacitors Q41, Q51, Q61, ... are outputted. The pixel data of the entire pixels in the first line are thus outputted.

When the reading operation of the pixel data of the entire pixels in the first line is completed, the reading operation proceeds to pixel data in a second line, prior to which the noise cancellation is carried out. More specifically, the clamp switch CL is closed and a direct current power supply EE1 for clamp is applied so that all of the clamp capacitors CC are reset to a predetermined potential.

The pixel is comprised of the photo diode and cell amplifier (floating/diffusion amplifier). A charge stored in the photo diode is outputted in the form of voltage via the cell amplifier. A variability, which is present in a threshold voltage VT of a transistor in the cell amplifier, results in an offset component deteriorating an image quality (for example, vertical stripes). This is referred to as the noise, and the noise eliminating circuit 243 serves to cancel the noise. As the clamp capacitor can utilize an MOS gate capacitance. After the clamp capacitors are reset, the clamp switches CL are opened, and the reading operation proceeds to pixel data in a next line.

When the pixel data in the next line is read, a line ahead is selected as the next line by the vertical shift selecting circuit 230. Thereafter, the foregoing operation is repeated. The pixel data of all of the pixels per line are sequentially read.

The pixel data of the entire pixels in one line is sequentially read while advancing to the line ahead as the next line to be selected, which is repeated until a final line, and the entire pixel data corresponding to one frame can be thereby read.

Nine Pixel Mixing Reading Mode

The first line of the photoelectric conversion element array 210 is selected by the vertical shift selecting circuit 230. All of the vertical transfer switches V1, V2, V3, ... are simultaneously closed, and the clamp capacitor CC is reset to a VT reference potential of the cell amplifiers through an ON OFF operation of the clamp switches CL. Thereafter, signal voltages of all of the cell amplifiers are outputted, and the vertical transfer switches V1, V2, V3, ... are simultaneously closed and the respectively first transmission switches a11, a21, a31, ... are simultaneously closed. Then, the voltage signals in the pixels p11, P21, P31, ... on the first line are supplied to respectively first capacitors C11, C21, C31. The clamp capacitor CC is reset through the ON→OFF operation of the clamp switch CL.

Next, the line to be selected is advanced to a line of two lines ahead by the vertical shift selecting circuit 230, and a third line is selected. All of the vertical transfer switches V1, V2, V3, . . . are simultaneously closed, and respectively second transmission switches a12, a22, a32, . . . are simultaneously closed. Then, voltage signals in pixels P13, P23, P33, . . . on the third line are supplied to respectively second capacitors C12, C22, C32, . . . . Then, the clamp capacitor CC is reset again in the foregoing manner.

Next, the line to be selected is advanced to a line of two lines ahead by the vertical shift selecting circuit 230, and a fifth line is selected. All of the vertical transfer switches V1, V2, V3, . . . are simultaneously closed, and respectively third transmission switches a13, a23, a33, . . . are simultaneously closed. Then, voltage signals in pixels P15, P25, P35, . . . on the fifth line are supplied to respectively third capacitors C13, C23, C33, . . . . Then, the clamp capacitor CC is reset again in the foregoing manner.

As described, focusing on the groups of pixels from the first column through sixth column in the first line, third line and fifth line, the pixel data of three G (green) pixels in the first column are retained in the capacitors C11, C12, C13, the pixel data of three R (red) pixels in the second column are retained in the capacitors C21, C22, C23, the pixel data of three G pixels in the third column are retained in the capacitors C31, C32, C33, the pixel data of three R pixels in the fourth column are retained in the capacitors C41, C42, C43, the pixel data of three G pixels in the fifth column are retained in the capacitors C51, C52, C53, and the pixel data of three R pixels in the sixth column are retained in the capacitors C61, C62, C63. The foregoing relationship applies to other columns.

All of the nine pixels in the first line, third line, fifth line, and in the first column, third column and fifth column are the G (green) pixels, and the respective pixel data are retained in the capacitors C1, C12, C13, C31, C32, C33, C51, C52 and C53. Therefore, when the nine horizontal transfer switches H11, H12, H13, H31, H32, H33, H51, H52 and H53 corresponding to these capacitors are simultaneously switched so as to charge the signal-output capacitor Cout, the pixel data of nine G (green) pixels of are mixed, and the nine-pixel-mixed pixel data of G is outputted from the output amplifier 260 based on the mixed nine pixels, which corresponds to nine-pixel-mixed pixel data D1 of G shown in FIG. 5.

All of the nine pixels in the first line, third line, fifth line, and in the second column, fourth column and sixth column are the pixels of R (red), and the respective pixel data are retained in the capacitors C21, C22, C23, C41, C42, C43, C61, C62 and C63. Subsequent to the reading of the nine-pixel-mixed pixel data of G (green), the nine horizontal transfer switches corresponding to the foregoing capacitors H21, H22, H23, H41, H42, H43, H61, H62 and H63 are simultaneously switched so as to charge the signal-output capacitor Cout. Then, the pixel data of nine R pixels are mixed, and the nine-pixel-mixed pixel data of R (red) is outputted from the output amplifier 260 based on the mixed nine pixels, which corresponds to nine-pixel-mixed pixel data D2 of R shown in FIG. 5.

When nine horizontal transfer switches corresponding to capacitors C71, C72, C73, C91, C92, C93, C111, C112 and C113, though not shown, are simultaneously switched, nine-pixel-mixed pixel data of the next G is outputted from the output amplifier 260, which corresponds to nine-pixel-mixed pixel data D3 of G shown in FIG. 5.

Further, when nine horizontal transfer switches corresponding to capacitors C81, C82, C83, C101, C102, C103, C121, C122 and C123, though not shown, are simultaneously switched, nine-pixel-mixed pixel data of the next R is outputted from the output amplifier 260, which corresponds to nine-pixel-mixed pixel data D4 of R shown in FIG. 5.

When the output of the pixel data of G, R, G, R, . . . in one line in the pixel-thinned state is completed, the line to be selected is advanced by one line by the vertical shift selecting circuit 230, and the foregoing operation is repeated. Thereby, nine-pixel-mixed pixel data D5 of B, nine-pixel-mixed pixel data D6 of G, nine-pixel-mixed pixel data D7 of B, nine-pixel-mixed pixel data D8 of G and the like shown in FIG. 5 are outputted.

When the output of the pixel data of B, G, B, G, . . . in one line in the pixel-thinned state is completed, the line to be selected is advanced by five lines by the vertical shift selecting circuit 230, and the foregoing operation is repeated. Thereby, nine-pixel-mixed pixel data D9 of G, nine-pixel-mixed pixel data D10 of R, nine-pixel-mixed pixel data D11 of G, nine-pixel-mixed pixel data D12 of R and the like shown in FIG. 5 are outputted.

When the output of the pixel data of G, R, G, R, . . . in one line in the pixel-thinned state is completed, the line to be selected is advanced by one line by the vertical shift selecting circuit 230, and the foregoing operation is repeated. Thereby, nine-pixel-mixed pixel data D13 of B, nine-pixel-mixed pixel data D14 of G, nine-pixel-mixed pixel data D15 of B, nine-pixel-mixed pixel data D16 of G and the like shown in FIG. 5 are outputted.

Vertical-Direction-Only Pixel Mixing Reading Mode

The charging operation with respect to the capacitors using the pixel data read in the vertical-direction-only pixel mixing reading mode is the same as in the nine pixel mixing reading mode.

More specifically, the first line of the photoelectric conversion element array 210 is selected by the vertical shift selecting circuit 230. All of the vertical transfer switches V1, V2, V3, . . . are simultaneously closed, and the respectively first transmission switches a11, a21, a31, . . . are simultaneously closed. The voltage signals in the pixels P11, P21, P31, . . . are supplied to the first capacitors C11, C21, C31, . . . . Then, the clamp capacitor CC is reset through the ON→OFF operation of the clamp switch CL.

Next, the line to be selected is advanced to the line of two lines ahead by the vertical shift selecting circuit 230, and the third line is selected. All of the vertical transfer switches V1, V2, V3, . . . are simultaneously closed, and the respectively second transmission switches a12, a22, a32, . . . are simultaneously closed. Then, the voltage signals in pixels P13, P23, P33, . . . on the third line are supplied to the respectively second capacitors C12, C22, C32, . . . . Then, the clamp capacitor CC is reset again in the foregoing manner.

Next, the line to be selected is advanced to the line of two lines ahead by the vertical shift selecting circuit 230, and the fifth line is selected. All of the vertical transfer switches V1, V2, V3, . . . are simultaneously closed, and the respectively third transmission switches a13, a23, a33, . . . are simultaneously closed. Then, voltage signals in pixels P15, P25, P35, . . . on the fifth line are supplied to the respectively third capacitors C13, C23, C33, . . . . Then, the clamp capacitor CC is reset again in the foregoing manner As described, focusing on the groups of pixels from the first column through sixth column in the first line, third line and fifth line, the pixel data of three pixels of G (green) in the first column are retained in the capacitors C11, C12, C13, the pixel data of three pixels of R (red) in the second column are retained in the capacitors C21, C22, C23, the pixel data of three pixels of G in the third column are retained in the capacitors C31, C32, C33, the pixel data of three pixels of R in the fourth column are retained in the capacitors C41, C42, C43, the pixel data of three pixels of G in the fifth column are retained in the capacitors C51, C52, C53, and the pixel data of three pixels of R in the sixth column are retained in the capacitors C61, C62, C63. The foregoing relationship applies to other columns.

So far, there is no difference relative to the case of the vertical/horizontal pixel mixing reading mode.

All of the three pixels in the first line, third line, fifth line, and in the first column are the pixels of G (green), and the respective pixel data are retained in the capacitors C111, C12 and C13. When the three horizontal transfer switches H11, H12 and H13 corresponding to these capacitors are simultaneously switched so as to charge the signal-output capacitor Cout, the pixel data of the three pixels of G (green) are mixed, and the three-pixel-mixed pixel data of G is outputted from the output amplifier 260 based on the mixed three pixels, which corresponds to three-pixel-mixed pixel data d1 of G shown in FIG. 6.

All of the three pixels in the first line, third line, fifth line, and in the second column are the pixels of R (red), and the respective pixel data are retained in the capacitors C21, C22 and C23. When the three horizontal transfer switches H21, H22 and H23 corresponding to these capacitors are simultaneously switched so as to charge to the signal-output capacitor Cout, the pixel data of the three pixels of R are mixed, and the three-pixel-mixed pixel data of R is outputted from the output amplifier 260 based on the mixed three pixels, which corresponds to three-pixel-mixed pixel data d2 of G shown in FIG. 6.

All of the three pixels in the first line, third line, fifth line, and in the third column are the pixels of G (green), and the respective pixel data are retained in the capacitors C31, C32 and C33. When the three horizontal transfer switches H31, H32 and H33 corresponding to these capacitors are simultaneously switched so as to charge to the signal-output capacitor Cout, the pixel data of the three pixels of G are mixed, and the three-pixel-mixed pixel data of G is outputted from the output amplifier 260 based on the mixed three pixels, which corresponds to three-pixel-mixed pixel data d3 of G shown in FIG. 6.

All of the three pixels in the first line, third line, fifth line, and in the fourth column are the pixels of R (red), and the respective pixel data are retained in the capacitors C41, C42 and C43. When the three horizontal transfer switches H41, H42 and H43 corresponding to these capacitors are simultaneously switched so as to charge to the signal-output capacitor Cout, the pixel data of the three pixels of R are mixed, and the three-pixel-mixed pixel data of R is outputted from the output amplifier 260 based on the mixed three pixels, which corresponds to three-pixel-mixed pixel data d4 of G shown in FIG. 6.

When the output of the pixel data of G, R, G, R, . . . in one line in the state of thinning the pixels in the vertical direction only and selecting the entire pixels in the horizontal direction is completed, the line to be selected is advanced by one line by the vertical shift selecting circuit 230, and the foregoing operation is repeated. Thereby, three-pixel-mixed pixel data d5 of B, three-pixel-mixed pixel data d6 of G, three-pixel-mixed pixel data d7 of B, three-pixel-mixed pixel data d8 of G and the like shown in FIG. 6 are outputted.

When the output of the pixel data of B, G, B, G . . . in one line in the state of thinning the pixels in the vertical direction only and selecting the entire pixels in the horizontal direction, the line to be selected is advanced by five lines by the vertical shift selecting circuit 230, and the foregoing operation is repeated. Thereby, three-pixel-mixed pixel data d9 of G, three-pixel-mixed pixel data d10 of R, three-pixel-mixed pixel data d11 of G, three-pixel-mixed pixel data d12 of R and the like of G shown in FIG. 6 are outputted.

When the output of the pixel data of G, R, G, R, . . . in one line in the state of thinning the pixels in the vertical direction only and selecting the entire pixels in the horizontal direction, the line to be selected is advanced by one line by the vertical shift selecting circuit 230, and the foregoing operation is repeated. Thereby, three-pixel-mixed pixel data d13 of B, three-pixel-mixed pixel data d14 of G, three-pixel-mixed pixel data d15 of B, three-pixel-mixed pixel data d16 of G and the like of G shown in FIG. 6 are outputted.

Another Embodiment

Figure 11:
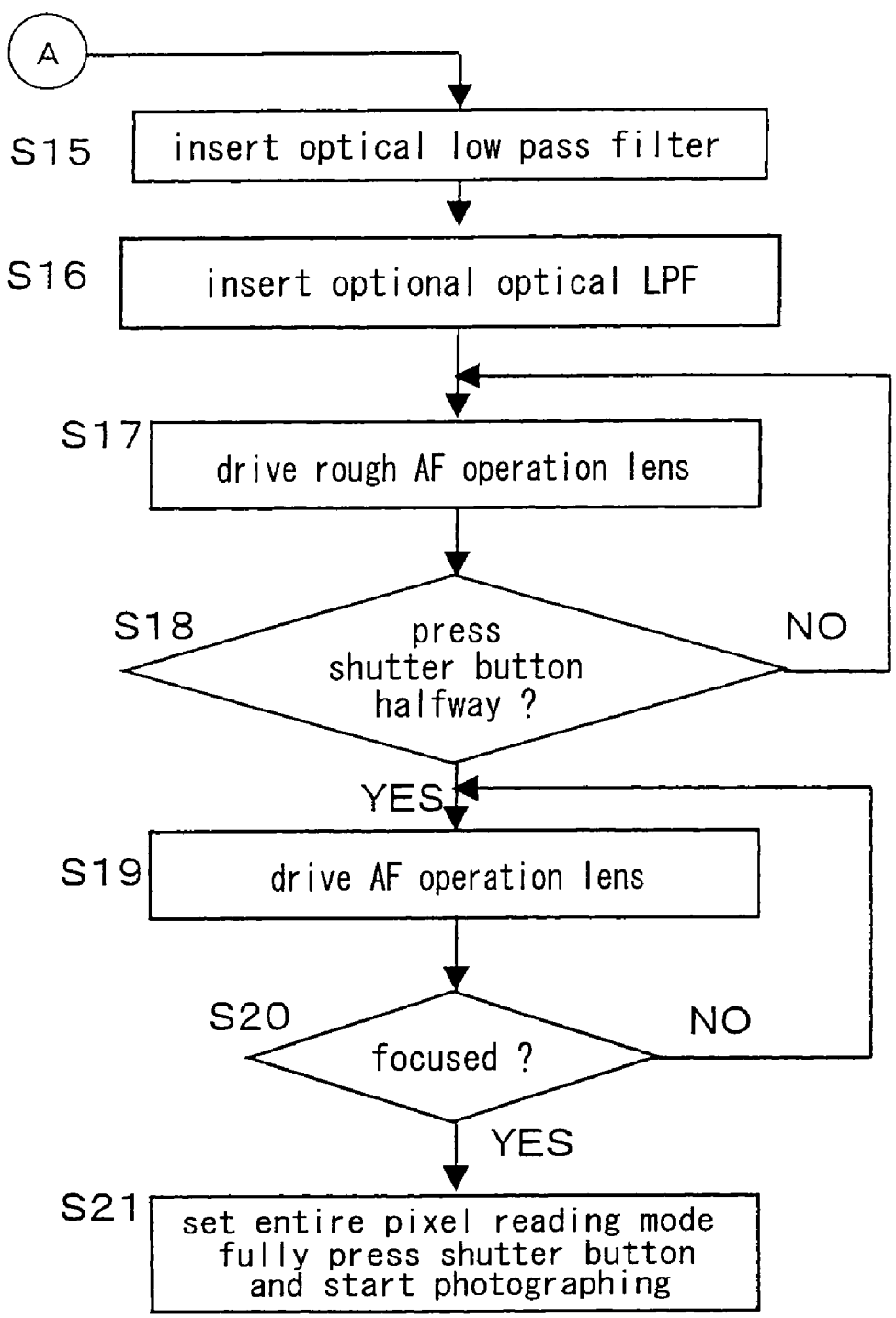
FIG. 11 is a flow chart of an operation of an image pickup device according to another embodiment of the present invention.
Figure 12:
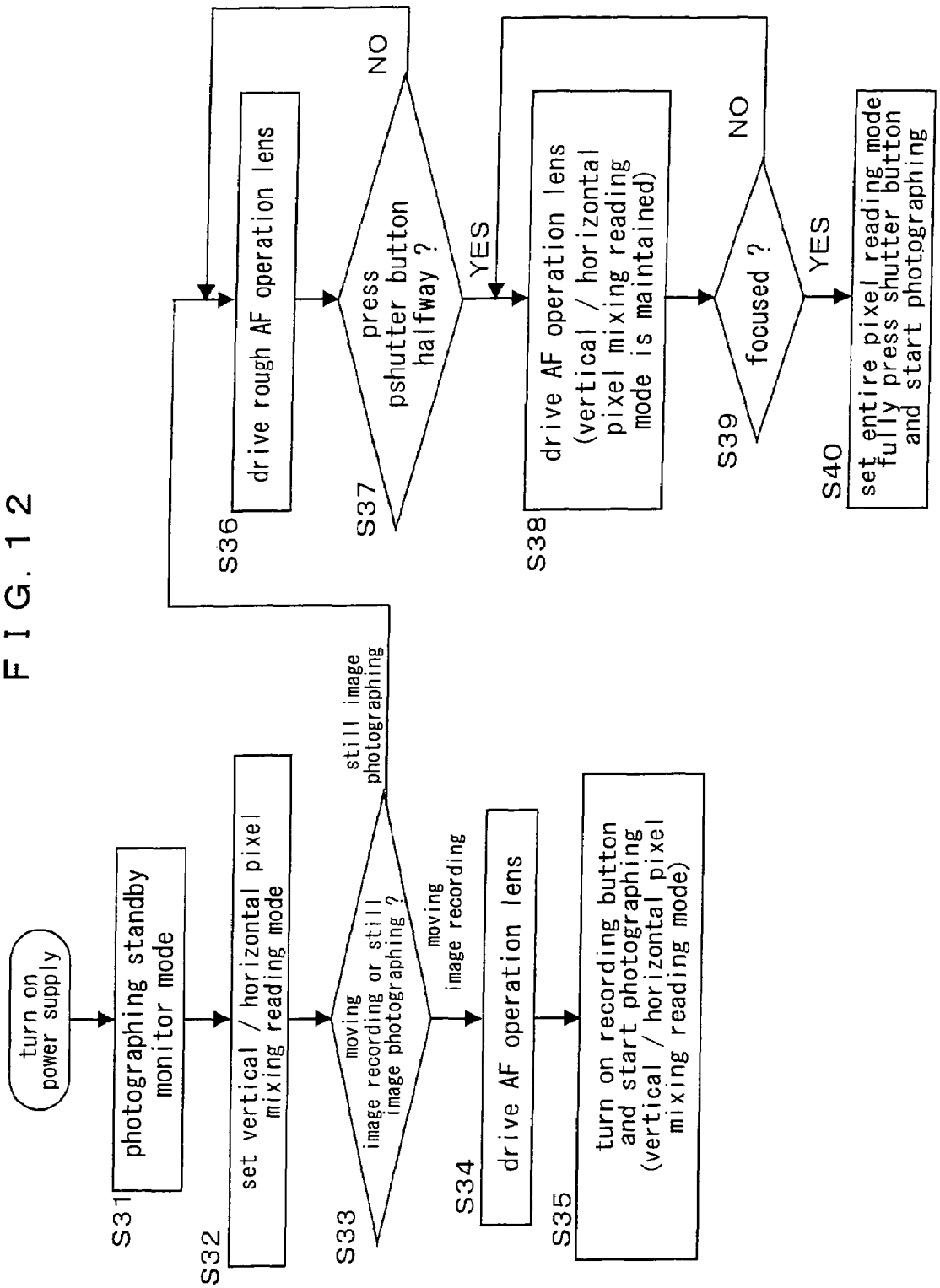
FIG. 12 is a flow chart of an operation of an image pickup device according to a conventional technology.
Figure 13A:
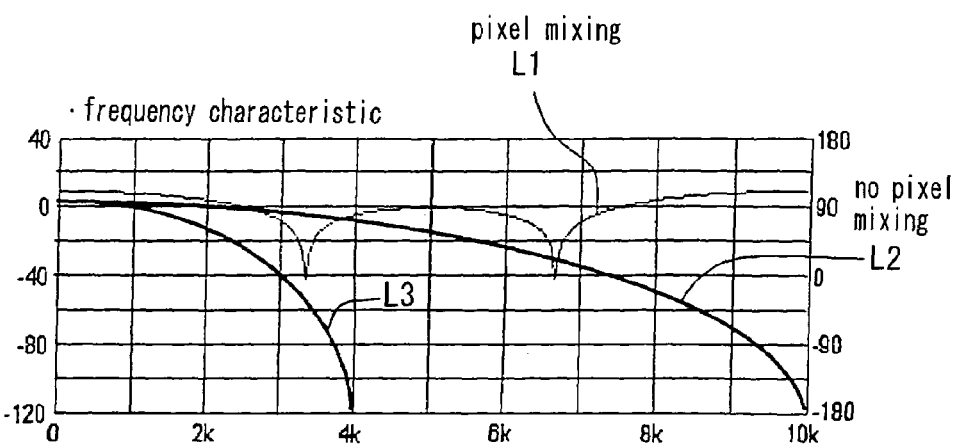
FIG. 13A shows a frequency characteristic of pixel data.
Figure 13B:
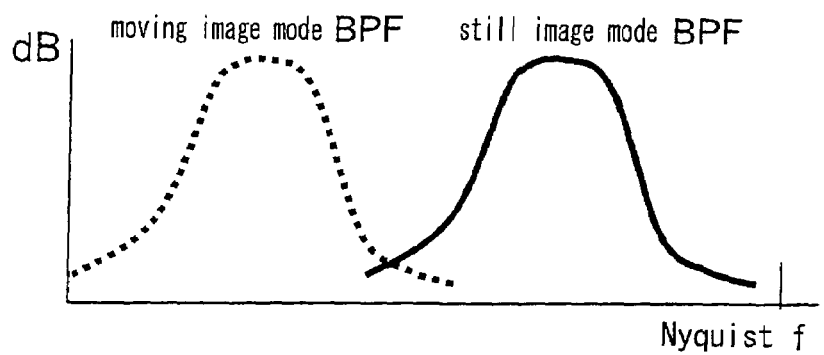
FIG. 13B shows a frequency characteristic of a band pass filter.

FIG. 11 is a flow chart of another embodiment of the present invention corresponding to FIG. 3.

In the case of selecting the still image photographing mode in the Step S3 shown in FIG. 2 and selecting the small-size photographing mode in the Step S7, the operation proceeds to Step S15 shown in FIG. 11, in which the optical low pass filter A7 is disposed between the optional system A1 and the photoelectric conversion element array A2 so as to eliminate the high frequency component of the optical image. Then, the operation proceeds to Step S16.

In the Step S16, an optical low pass filter (optional optical low pass filter) having a frequency characteristic in compliance with the pixel pitch of the small-size data recorded in the horizontal/vertical pixel mixing mode is inserted. In Step S17, the lenses of the optical system A1 are driven by the rough auto focus. In Step S18, it is judged if the shutter button is pressed halfway, and the operation proceeds to Step S19 when the halfway-focused state is confirmed. Next, in the Step S19, the high-precision auto focus including software processes is activated and the lenses of the optical system A1 are driven. The operation proceeds to Step S21 when it is judged that the focusing is attained in Step S20. In the Step S20, the shutter button is allowed to be fully pressed after the entire pixel reading mode is set, and the still image photographing in the entire pixel reading mode is carried out.

As described, the optical low pass filter A7 is disposed between the optical system A1 and the photoelectric conversion element array A2 when the small-size still image is recorded. Thereby, the high frequency component of the optical image having transmitted through the lenses of the optical system A1 and the optical low pass filter A7 is band-restricted, and the image does not undergo any distortion generated by the folded-back high frequency component when the image is reduced by means of a so-called digital zoom, which enables the high-quality still image in a reduced size to be recorded.

According to still another embodiment of the present invention, a plurality of low pass filters for blocking the high frequency component in the vertical direction or the horizontal direction of the optical image is provided between the optical system A1 and the photoelectric conversion element array A2 so as to advance and retreat therebetween. Further, in the one-direction-only pixel mixing reading mode, the optical low pas filters for blocking the high frequency component in the one direction in which the pixels are mixed are advanced into between the optical system A1 and the photoelectric conversion element array A2 so as to eliminate the high frequency component of the optical image.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. An image pickup device comprising:
   (a) an optical system;
   (b) a photoelectric conversion element array for photoelectrically converting an optical image entering through the optical system and outputting the converted optical image in the form of pixel data;
   (c) a pixel data reading control unit for reading the pixel data from the photoelectric conversion element array in a still image-compliant entire pixel reading mode and a moving image-compliant pixel mixing reading mode;
   (d) an optical low pass filter provided between the optical system and the photoelectric conversion element array so as to advance and retreat therebetween; and
   (e) a control unit for controlling the advancement/retreat of the optical low pass filter,
   wherein the control unit makes the optical low pass filter advance into between the optical system and the photoelectric conversion element array in the moving image-compliant pixel mixing reading mode,
   wherein the control unit makes the optical low pass filter retreat from between the optical system and the photoelectric conversion element array in the still image-compliant entire pixel reading mode,
   wherein the pixel data reading control unit comprises a mode for pixel-mixing and reading pixel data only in one of vertical and horizontal directions in the pixel data of the photoelectric conversion element array (one-direction-only pixel mixing reading mode) at the time of an auto focus control in a still image photographing, and
   wherein the control unit judges if the still image photographing is a full-size photographing or a small-size photographing and makes the optical low pass filter retreat from between the optical system and the photoelectric conversion element array after the judgment is made.

2. An image pickup device as claimed in claim 1, wherein the control unit performs the auto focus control after the judgment is made.

3. An image pickup device as claimed in claim 1, wherein the control unit performs a rough auto focus after the judgment is made and performs a high-precision auto focus after judging if a shutter button is pressed halfway.

4. An image pickup device as claimed in claim 3, wherein the pixel data reading control unit reads the pixel data in the one-direction-only pixel mixing reading mode after it is judged that the shutter button is pressed halfway and reads the pixel data in the entire pixel reading mode when a focusing is attained.

5. An image pickup device as claimed in claim 1, wherein the control unit inserts a second optical low pass filter having a frequency characteristic in compliance with a pixel pitch of small-size data into between the optical system and the photoelectric conversion element array when it is judged that the small-size photographing is carried out and a focusing is attained, and
   the pixel data reading control unit reads the pixel data in the entire pixel reading mode after the insertion of the second optical low pass filter.

6. An image pickup device as claimed in claim 1, wherein the control unit inserts the optical low pass filter into between the optical system and the photoelectric conversion element array, then inserts a second optical low pass filter having a frequency characteristic in compliance with a pixel pitch of small-size data into between the optical system and the photoelectric conversion element array when it is judged that the small-size photographing is carried out, and performs a rough auto focus in the state in which the two optical low pass filters are inserted, and
   the pixel data reading control unit reads the pixel data in the one-direction-only pixel mixing reading mode with the shutter button remaining pressed halfway in the state of the rough auto focus control.

7. An image pickup device as claimed in claim 6, wherein
   the control unit performs a high-precision auto focus control based on the pixel data read in the one-direction-only pixel mixing reading mode by the pixel data reading control unit, and
   the pixel data reading control unit reads the pixel data in the entire pixel reading mode when a focusing is attained in the state of the high-precision auto focus control.

8. An image pickup device comprising:
   (a) an optical system;
   (b) a photoelectric conversion element array for photoelectrically converting an optical image entering through the optical system and outputting the converted optical image in the form of pixel data;
   (c) a pixel data reading control unit comprising a one-direction-only pixel mixing reading mode at the time of an auto focus control in reading the pixel data from the photoelectric conversion element array in addition to a still image-compliant entire pixel reading mode and a moving image-compliant pixel mixing reading mode;
   (d) an optical low pass filter provided between the optical system and the photoelectric conversion element array so as to advance and retreat therebetween;
   (e) a control unit for controlling the advancement/retreat of the optical low pass filter and an auto focus and
   (f) a plurality of optical low pass filters for blocking a high frequency component in one of vertical and horizontal directions,
   wherein the pixel data reading control unit reads the pixel data in the pixel mixing reading mode in the moving image recording, reads the pixel data in the one-direction-only pixel mixing reading mode in the still image photographing when a shutter button is pressed halfway, and switches to the entire pixel reading mode when a focusing is attained, and the control unit controls the advancement of the optical low pass filter in the moving image-compliant pixel mixing reading mode, controls the retreat of the optical low pass filter and performs a rough auto focus control in the still image-compliant entire pixel reading mode, performs a high-precision auto focus when a shutter button is pressed halfway, and allows the shutter button to be fully pressed when the focusing is attained,
   wherein the control unit makes the optical low pass filters for blocking the high frequency component in the one direction in which pixels are mixed advance into between the optical system and the photoelectric conversion element array in the one-direction-only pixel mixing reading mode, and
   wherein the pixel data reading control unit comprises, in the one-direction-only pixel mixing reading mode, a first mixing halt mode in which the mixing is halted in the horizontal direction of the photoelectric conversion element array and the mixed pixel data only in the vertical direction is outputted for the auto focus and a second mixing halt mode in which the mixing is halted in the vertical direction of the photoelectric conversion element array and the mixed pixel data only in the horizontal direction is outputted for the auto focus, the pixel data reading control unit being adapted to optionally switch to and from the first mixing halt mode and the second mixing halt mode, and the control unit controls the advancement/retreat of the plurality of optical low pass filters depending on the modes.

* * * * *

UNITED STATES PATENT AND TRADEMARK OFFICE
CERTIFICATE OF CORRECTION

PATENT NO. : 7,656,455 B2
APPLICATION NO. : 11/143481
DATED : February 2, 2010
INVENTOR(S) : Toshinobu Hatano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1262 days.

Signed and Sealed this

Thirtieth Day of November, 2010

David J. Kappos
*Director of the United States Patent and Trademark Office*